United States Patent [19]

Balint et al.

[11] Patent Number: 5,015,455

[45] Date of Patent: May 14, 1991

[54] DISULFONATE PROCESS CONTROL

[75] Inventors: Laszlo J. Balint; Lamberto Crescentini, both of Chester, Va.

[73] Assignee: Allied-Signal Inc., Morris Township, Morris County, N.J.

[21] Appl. No.: 289,121

[22] Filed: Dec. 23, 1988

[51] Int. Cl.$^5$ .................................. C01B 21/093
[52] U.S. Cl. ........................................ 423/388
[58] Field of Search ................................ 423/388

[56] References Cited

U.S. PATENT DOCUMENTS 2,772,145  2/1953  Joris et al. .................. 23/104

FOREIGN PATENT DOCUMENTS

237297A1  5/1985  Fed. Rep. of Germany .

OTHER PUBLICATIONS

Patent Abstracts of Japan–vol. 6, No. 131 (C-114) (1009) Jul. 17, 1982; and JP-A-5756308 (Ube Kosan K.K.) 03.04.1982.

Primary Examiner—Wayne A. Langel

[57] ABSTRACT

In a process for the production of hydroxylamine disulfonate diammonium salt (DS) comprising feeding an aqueous ammoniuum nitrite solution, SO$_2$ gas and trim ammonia to a packed column to create a reaction mixture to produce DS; the improvement comprising controlling said process by measuring the pH of the DS product solution stream, comparing said pH with a pre-selected pH value, and adjusting for deviation of pH by adjusting the feed of nitrite solution and measuring the concentration of unreacted nitrite in the DS product solution stream, comparing said concentration with a pre-selected concentration value, and adjusting for deviation of said concentration by adjusting the feed of trim ammonia.

4 Claims, 1 Drawing Sheet

DISULFONATE PROCESS CONTROL

BACKGROUND OF THE INVENTION

1. Field of the Invention

The subject matter of the invention is directed to a process for the production of hydroxylamine disulfonate diammonium salt (DS) and the effective control of said process.

2. Description of Related Art

Hydroxylamine is widely useful in the transformation of organic compounds to derivatives, which in turn may be intermediates in pharmaceutical or other industrial synthesis of complex molecules. An important use of hydroxylamine is captively in the synthesis of caprolactam, the raw material for nylon 6.

The classical method for the production of hydroxylamine is that ascribed to Raschig. An important commercial process consists of the reduction of ammonium nitrite with ammonium bisulfite and sulfur dioxide to give hydroxylamine disulfonate diammonium salt (DS). Upon hydrolysis, DS gives hydroxylamine sulfate, an intermediate in the production of caprolactam. The overall reaction for production of DS is:

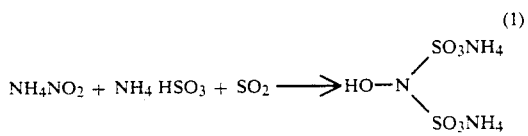

(1)

where $NH_4HSO_3$ is produced from $SO_2$ and a basic ammonium compound:

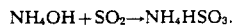

(2)

In commercial practice, the reaction is conducted in a packed tower or column where a solution of the product is recirculated, an aqueous nitrite solution is fed to the recirculating product stream, and supplemental trim ammonia, such as ammonium hydroxide or ammonium carbonate or bicarbonate is added in an amount to satisfy the stoichiometric requirements $NO_2^-/NH_4^+ = \frac{1}{2}$, and $SO_2$ gas, obtained for example by combustion of sulfur with air, is fed at the bottom of the packed column and is vigorously contacted with the liquid in the packed section of the tower.

The amount of $SO_2$ fed to the tower should also satisfy the requirements of equation (1) above and the three reactants should therefore be fed in the molar proportions $NO_2^-/NH_4^+/SO_2 = 1/2/2$.

However, in plant practice it has been found that controlling the reaction in this manner by controlling the feed for reactant ratios is not feasible since unexpected fluctuations of concentrations in liquid and gas streams occur often in the feed to the packed tower.

The reaction is complex, with the possibility of many side reactions which have been discussed authoritatively in a review by F. Seel, *Fortschr. Chem. Forsch.* 4, 301–332 (1963).

It is desirable, therefore, to develop an effective control method to control the process for production of DS.

SUMMARY OF THE INVENTION

This invention is directed to a process for the production of hydroxylamine disulfonate diammonium salt (DS) comprising:

(a) recirculating a portion of a DS product solution stream to a packed reaction column;

(b) feeding an aqueous ammonium nitrite solution to said DS product solution stream portion;

(c) feeding $SO_2$ gas to said packed column to obtain sufficient contact of said $SO_2$ with the nitrite-containing DS product solution, thereby creating a reaction mixture to produce DS;

(d) feeding trim ammonia to the reaction mixture in an amount sufficient to satisfy stoichiometric requirements of ammonium ion in said reaction mixture; and (e) withdrawing a DS product solution stream from said packed column, retaining a portion as product and recirculating the remaining portion to step (a) above;

the improvement comprising controlling said process by the steps comprising:

(f) measuring the pH of the DS product solution stream from step (e) above and comparing said pH with a pre-selected pH value;

(g) adjusting for deviation of pH from said preselected pH value by adjusting the feed of nitrite solution in step (b) above;

(h) measuring the concentration of unreacted nitrite in the DS product solution stream from step (e) above and comparing said concentration with a pre-selected concentration value; and (i) adjusting for deviation of said concentration from said pre-selected concentration value by adjusting the feed of trim ammonia in step (d) above.

DESCRIPTION OF THE PREFERRED EMBODIMENT

Figure 1:
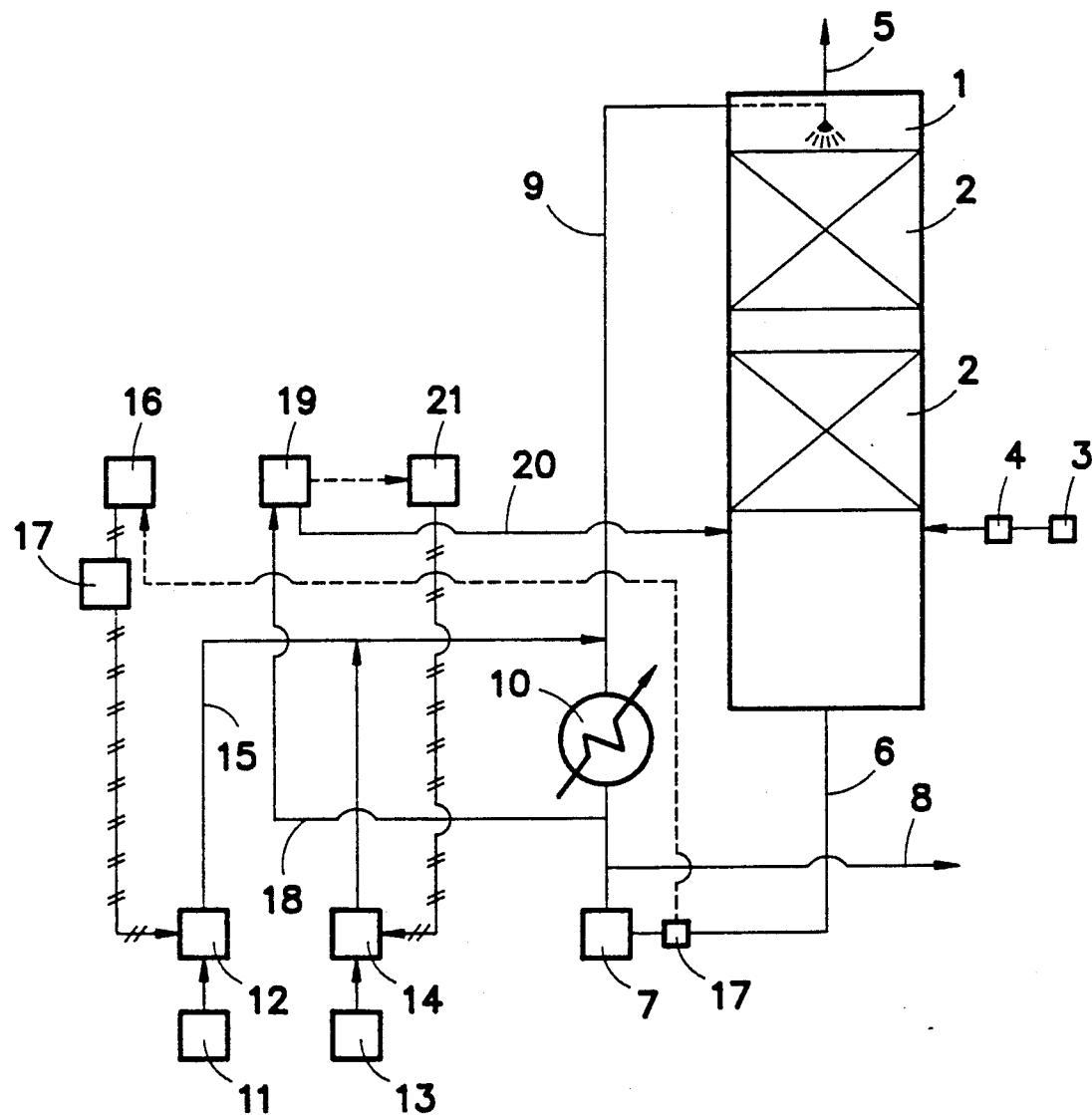
FIG. 1 shows a schematic arrangement of equipment useful in performance of the process, including control means of this invention.

We have found that the commercial process of production of DS according to equation 1 above can be controlled effectively, thereby obtaining high yields of DS and maintaining $NO_x$ emissions at a low level. This is accomplished in the following manner.

A preferred embodiment incorporating the control means of this invention is illustrated in FIG. 1. Packed column or tower 1 contains appropriate packing 2 to insure sufficient contact of $SO_2$ gas with the liquid reactants. Appropriate packing, for example, may be ½ inch Intalox TM saddles. $SO_2$ gas is provided at a fixed rate from a source 3 and enters the tower through a flow meter 4 at a point to permit upward flow through packing to insure said sufficient contact. $SO_2$ gas may be obtained for example by combustion of sulfur in air to provide a gas containing 15–18% $SO_2$, with the balance $N_2$ and $O_2$. Vent 5 is provided to allow for gaseous emissions from the tower. A DS product solution stream is removed from below the packing at line 6. A portion of the product stream is removed as product through line 8 while the remaining portion is recirculated through line 9 to the top of the tower packing. Pump 7 provides necessary pressure for said removal and recirculation of product stream. A heat exchanger 10 serves to remove reaction heat and control operating temperature of the system, which should be less than 20° C.

A nitrite-containing aqueous solution is provided from a source 11 through flow control means 12, for example a valve or a pump. The nitrite solution is preferably added through line 15 to the recirculating portion of the DS product stream in line 9 to aid in mixing, but it may also be added at other points, such as directly to the top of the tower packing, as will be obvious to those skilled in the art. The preferred nitrite solution consists of $NH_4NO_2$, so that addition of nitrite also adds a large portion of required ammonium ion. The nitrite solution may additionally comprise some ammonium carbonate/bicarbonate such as that unreacted in a previous step of nitrite synthesis. It is preferred that the nitrite solution contain 75 to 95%, more preferably 85 to 90% of the stoichiometric requirements of ammonium ion for the desired reaction to produce DS.

Trim ammonia is provided from source 13 through flow control mean 14. It is preferred that trim ammonia be added as an aqueous solution containing $NH_4^+$ to the recirculating portion of the DS product stream in line 9 to aid in mixing, but it may be added at other points such as directly to the top of the tower packing, or at the bottom or an intermediate point in the packing as gaseous ammonia, as will be obvious to those skilled in the art. The illustration shows an effective manner of adding trim ammonia to the nitrite solution in line 15.

Trim, or supplemental, ammonia is preferably a basic solution such as ammonium hydroxide or carbonate, and is added to balance the stoichiometric requirements $NO_2^-/NH_4^+ = \frac{1}{2}$. With 85 to 90% of the $NH_4^+$ requirements provided by the nitrite feed, then only about 10 to 15% must be added as trim. This permits fast corrective response to reaction conditions in the tower and process fluctuations are therefore smaller. The advantage of corrections by trim $NH_4^+$ is that (a) it involves only one ion, $NH_4^+$, and not two as by the nitrite feed control, which changes both $NH_4^+$ and $NO_2$ ions, and (b) excess $NO_2^-$ ion in the system ($NH_4^+/NO_2^- < 1.98$) produces DS only by adding $NH_4^+$. By any other reaction of $NO_2^-$ in a $NH_4^+$ deficient system, undesirable byproducts will be produced ($N_2$, $NO$, $N_2O$).

The control aspect of this invention works in the following manner.

The flow rate of the ammonium nitrite solution is controlled by pH meter 16 which measures the pH of the DS product stream on-line through electrode 17. The product stream pH is compared to a pre-selected pH value which is in the range of 3.5 to 4.0, preferably 3.6 to 3.8. If there is deviation from the pre-selected pH value, such deviation is fed to controller transducer 17 which controls flow control means 12. For low values of pH, deviations are corrected by increases in the nitrite solution flow and for high values of pH deviations are corrected by decreases in the nitrite solution flow. The pH meter 16 can be an in-line standard range pH electrode meter commercially available from Great Lakes Instrument Company.

Simultaneously, a sample of the DS product stream is withdrawn through line 18 to UV analyzer 19, then returned to the tower through line 20. The UV analyzer can be a single wavelength spectrophotometer calibrated for readings in the range of 0 to 1000 ppm of a specific ion, i.e. $NO_2^-$. Such equipment is commercially available from DuPont. The purpose of the on-line UV analysis is to measure for residual or unreacted nitrite in the product stream and for this purpose the wavelength of the spectrophotometer is set at 310 nanometers. Deviations from this set point are transmitted to controller transducer 21 which controls flow control means 14. If values of UV readings are high, indicating that the residual nitrite level is above the actual set point, then trim ammonia is increased, thereby insuring that the desired stoichiometric ratio of $NO_2^-/NH_4^+$ is maintained. If values of the UV reading are low, then trim ammonia is decreased, allowing thus the increase of $NO_2^-$ feed to self-adjust to the correct $NO_2^-$ input at the preset pH and to consume the excess of $NH_4^+$ in the system. If $NH_4^+$ in the feed would exceed for any reason the $2NH_4^+/1NO_2^-$ ratio, the trim $NH_4^+$ feed would shut off automatically due to the residual nitrite level below the actual set point.

It will be obvious to those skilled in the art that other instruments available for measuring ion concentrations such as an ion chromatograph may be appropriately utilized in place of the UV analyzer.

With the control system of this invention, there is no need for continuous analysis of the feed for reactant ratios or feed rate adjustments. Existing and well established instrumentation can be used, one for pH and another for residual nitrite, each of them tied to the respective flow controllers. The signals from the two measuring instruments can be fed to the devices described to make the corrections automatically.

The findings herein are unusual since it would seem natural to control pH with trim ammonia (adding more or less quantity of a base) and to control UV (unreacted nitrite) by adding more or less quantity of nitrite solution (at a fixed rate of $SO_2$) since the reaction is one of reduction of nitrite ion by tetravalent sulfur. In fact, this "natural" method has been in use for some years in the plant.

EXAMPLE 1

A tower essentially as illustrated in FIG. 1 was operated in the following manner: The tower was a 4" diameter packed column containing 6 ft. of packing consisting of $\frac{1}{2}$ inch Intalox TM saddles. The $SO_2$ feed was set at 12.2 liter/min corresponding to 31.0 moles/hour (at 15% $SO_2$ in $N_2$). A $NH_4NO_2$ solution was fed at 7.1 liter/hour corresponding to 16.0 moles/hour $NO_2^-$ and 12.64 moles/hour $NH_4^+$. Trim $NH_4^+$ was fed as a solution of ammonium carbonate at 5.56 moles/liter concentration at a rate of 0.61 liter/hour corresponding to 3.4 moles/hour $NH_4^+$. The tower temperature was maintained at 2° C. The pH pre-selected value was set at 3.8. The UV pre-selected value was set for a residual $NO_2^-$ in the product stream of 100 ppm. The process operated smoothly, controlled in the manner of this invention, with a product stream removed as product at a rate of 7.9 liter/hour, corresponding to 14.27 moles/hour DS at a product yield of 89.2%.

EXAMPLE 2

A pilot plant operation was conducted as in Example 1 with pH set at 3.8 and residual nitrite at 120 ppm. At a certain moment of the operation, the $SO_2$ feed rate was intentionally reduced by 20% to similate an upset in the reaction process.

The pH jumped almost instantly from 3.8 to 5.1. Due to the lag required to readjust pH of the whole inventory of the tower, in about 12 minutes the pH returned to the set level due to automatic adjustment of the nitrite feed.

At the same time, the residual nitrite level increased from 120 ppm to 800 ppm but in the same time interval as the pH, this value came down to a level of about 80 ppm which was less than the original 120 ppm. At about 60 minutes after the onset of the upset, the trim $NH_4^+$ feed was automatically cut back, with residual nitrite then turning up to a level of 100 ppm. The pH of the system initially dropped when the trim $NH_4^+$ was cut back, but then automatically returned to the 3.8 pH set point. The process control of this invention in this manner satisfactorily compensated for the imposed upset.

What is claimed:

1. In a process for the production of hydroxylamine disulfonate diammonium salt (DS) comprising:
    (a) recirculating a portion of a DS product solution stream to a packed reaction column;
    (b) feeding an aqueous ammonium nitrite solution to said DS product solution stream portion;
    (c) feeding $SO_2$ gas to said packed column to obtain sufficient contact of said $SO_2$ with the nitrite-containing DS product solution, thereby creating a reaction mixture to produce DS;
    (d) feeding trim ammonia to the reaction mixture in an amount sufficient to satisfy stoichiometric requirements of ammonium ion in said reaction mixture; and
    (e) withdrawing a DS product solution stream from said packed column, retaining a portion as product and recirculating the remaining portion to step (a) above;

the improvement comprising controlling said process by the steps comprising:
    (f) measuring the pH of the DS product solution stream from step (e) above and comparing said pH with a pre-selected pH value;
    (g) adjusting for deviation of pH of said DS product solution stream from said pre-selected pH value by adjusting the feed of nitrite solution in step (b) above;
    (h) measuring the concentration of unreacted nitrite in the DS product solution stream from step (e) above and comparing said concentration with a pre-selected concentration value; and
    (i) adjusting for deviation of said concentration from said pre-selected concentration value by adjusting the feed of trim ammonia in step (d) above.

2. The process of claim 1 wherein said nitrite feed solution in step (b) contains 75 to 95% of the stoichiometric requirements of nitrite ion for the reaction mixture in step (c).

3. The process of claim 2 wherein said nitrite feed solution contains 85 to 90% of said stoichiometric requirements.

4. The process of claim 3 wherein measuring the concentration of unreacted nitrite in step (h) is by ultraviolet analysis.

* * * * *